Patented Feb. 10, 1948

2,435,593

UNITED STATES PATENT OFFICE 2,435,593

PROCESS FOR MAKING BIS-(3,5,6-TRI-CHLORO-2-HYDROXYPHENYL) METHANE

Max Luthy, Ridgewood, and William S. Gump, Montclair, N. J., assignors to Burton T. Bush, Inc., New York, N. Y., a corporation of New Jersey No Drawing. Application June 14, 1945, Serial No. 599,507

17 Claims. (Cl. 260—619)

This invention relates to an improved process for making bis-(3,5,6-trichloro-2-hydroxyphenyl) methane (sometimes referred to also as 2,2'-dihydroxy-3,5,6-3',5',6'-hexachloro diphenyl methane).

Bis-(3,5,6-trichloro-2-hydroxyphenyl) methane is a substance having desirable bactericidal and fungicidal properties. It may be employed to advantage in tooth pastes, ointments, creams, lotions and rubber goods, inter alia. In addition, when incorporated in small amounts in soaps, it exhibits the surprising quality—for a phenolic substance—of rendering such soaps germicidal.

We are aware of the prior art method for preparing bis-(3,5,6-trichloro-2-hydroxyphenyl) methane. This known method, as well as the bis-(3,5,6-trichloro-2-hydroxyphenyl) methane itself, has been patented by one of us. The known method involves the condensation of 2,4,5-trichlorophenol with formaldehyde in the presence of sulfuric acid. Large amounts of sulfuric acid are required in the patented process. Also, used therein during the condensation reaction are solvents like methyl alcohol. Moreover, the prior art condensation process calls for low temperatures, e. g., 0° to 5° C., and requires about 24 hours of reaction time.

In accordance with our present invention we avoid the use of large amounts of sulfuric acid, dispense entirely with the use of a solvent during the condensation reaction, conduct the reaction at elevated temperatures (thereby avoiding the need for expensive cooling equipment and material), and obtain substantially complete reaction within a period of minutes instead of hours. In economic terms, our present process results in savings in time and materials, reduction in costs, and increase in productivity of a given unit.

In accordance with our present invention, we react 2,4,5-trichlorophenol and a suitable formaldehyde-yielding material at an elevated temperature in the presence of a minor amount of strong sulfuric acid or oleum and over a period which need not exceed thirty minutes. The reaction products may be worked up in known manner (see U. S. Patent No. 2,250,480) to obtain bis-(3,5,6-trichloro-2-hydroxyphenyl) methane. Alternatively, the hereinafter-described novel purification method, forming a particular aspect of this invention, may be employed to yield substantially pure bis-(3,5,6-trichloro-2-hydroxyphenyl) methane in a simple and commercially desirable manner.

Suitable formaldehyde-yielding materials which can be employed herein include paraformaldehyde and trioxane. Any other substance which will yield formaldehyde under the reaction conditions may also be employed.

As the condensation agent, sulfuric acid may be employed in various acid concentrations. Excellent results have been obtained with sulfuric acid of 100% $H_2SO_4$ concentration up to and including oleum 20%. However, aqueous sulfuric acid solution of lower strength (e. g., 93% acid strength) and oleum of higher strength (e. g., oleum 50%) can also be employed. As will be understood by those skilled in the art, it is desired to bind the water formed during the reaction. Consequently, it is preferable to utilize oleum, e. g., oleum 20%.

The amounts of 2,4,5-trichlorophenol, formaldehyde-yielding substance and sulfuric acid employed can be varied over wide limits. It has been found advantageous to use the 2,4,5-trichlorophenol and formaldehyde-yielding substance in amounts such that there are present about 2 mols of the trichlorophenol to each mol of $CH_2O$. Especially desirable results are obtained when formaldehyde-yielding material is used in about 25% excess over that called for by the ratio of 2 mols of 2,4,5-trichlorophenol to 1 mol of $CH_2O$. When such an excess of formaldehyde-yielding material is employed it is found that there is a practically complete conversion of the trichlorophenol, thereby eliminating the necessity of having to separate or recover unreacted trichlorophenol.

One of the features of our process is the reduction in the amount of sulfuric acid used. Accordingly, it will be understood that it is desirable to use the smallest amount of sulfuric acid or oleum which is needed to accomplish the desired condensation of the trichlorophenol and $CH_2O$. We have found that especially desirable results are obtained when the quantity of acid or oleum used is of the order of about one third of the weight of the trichlorophenol employed.

The condensation may be conducted at elevated temperatures within a rather wide range. It is desirable to start the reaction at a temperature at or above the melting point of 2,4,5-trichlorophenol, and to maintain throughout the reaction period such temperature conditions as will permit of the stirring of the contents with equipment normally used for agitation. We have found that the initial temperature may be as low as 65° C. and that the temperature may be permitted to rise to 130° C. or even 150° C. during the reaction. If desired, the entire reaction may be conducted at the higher temperatures. In all cases, as will be understood by those skilled in the art, means for controlling the temperature of the contents of the reaction chamber should be at hand.

Though we do not wish to be limited to any particular method of and order in bringing the 2,4,5-trichlorophenol, formaldehyde-yielding material and sulfuric acid or oleum together, we have found it desirable to introduce the 2,4,5-trichlorophenol and formaldehyde-yielding material first into the reaction vessel and then to raise the temperature to at least about 65° C. before introducing the sulfuric acid or oleum. Also, we prefer to add the sulfuric acid or oleum slowly, over a 10 to 15 minute period, though if suitable precautions are taken, e. g., to control the temperature of the contents of the reaction vessel within the aforementioned range, and if rapid dispersion of the acid is effected, the acid may be charged into the reaction vessel much more rapidly.

As will be understood by those skilled in the art, the process is not restricted to any particular length of time of reaction. Suffice it to say that the reaction should be conducted as long as it takes to convert substantially all of 2,4,5-trichlorophenol into bis-(3,5,6-trichloro-2-hydroxyphenyl) methane. The time that this will require will depend on various factors, such as the ratio and amounts of the reactants and condensation agent, the facilities available to remove the heat liberated by the reaction, and the temperature of reaction. We have found that the reaction is substantially complete in thirty minutes and, in some cases, five minutes are long enough.

As noted above, a particular aspect of the present invention involves a novel method of isolating in substantially pure form the bis-(3,5,6-trichloro-2-hydroxyphenyl) methane formed during the reaction. This novel method is much simpler and more commercially feasible than the known method of isolating and purifying the bis-(3,5,6-trichloro-2-hydroxyphenyl) methane formed by condensing 2,4,5-trichlorophenol and a formaldehyde-yielding material.

In general, the novel method involves the formation and isolation of a mono-alkali metal salt of bis-(3,5,6-trichloro-2-hydroxyphenyl) methane and the regeneration of the bis-(3,5,6-trichloro-2-hydroxyphenyl) methane by treatment of the mono-alkali metal salt with acid. Substantially pure bis-(3,5,6-trichloro-2-hydroxyphenyl) methane may be obtained from the regenerated bis-(3,5,6-trichloro-2-hydroxyphenyl) methane by crystallization from a suitable solvent, e. g., toluene or benzene.

In carrying out this novel method of isolating and purifying bis-(3 5,6-trichloro-2-hydroxyphenyl) methane the condensation of 2,4,5-trichlorophenol and formaldehyde-yielding material is effected in accordance with this invention and the contents of the reaction vessel are made alkaline by running it into an excess of an aqueous solution of a base, such as sodium or potassium hydroxide. Alkali-insoluble material is then filtered off through a suitable filter medium. Prior to filtration, the contents may be boiled for several minutes to facilitate solution of alkali-soluble material.

The pH of the alkaline solution is then brought down, preferably to about 10.3 to about 11. A suitable agent for this purpose is strong sulfuric acid, e. g., of 62% acid strength. The mono-alkali metal salt of bis-(3,5,6-trichloro-2-hydroxyphenol) methane precipitates out of solution at a pH within the range of about 10.3 to about 11. It is filtered and then washed with water. Unreacted 2,4,5-trichlorophenol and other impurities remain in solution. The mono-alkali-metal salt of bis-(3,5,6-trichloro-2-hydroxyphenyl) methane is then suspended in a large quantity of water and acidified, e. g. with 62% strength sulfuric acid. Bis-(3,5,6-trichloro-2-hydroxyphenyl) methane is thereby regenerated. Crystallization from a suitable solvent, e. g., toluene yields substantially pure bis-(3,5,6-trichloro-2-hydroxyphenyl) methane.

In order to explain the invention more specifically the following examples are given, but it is understood that they are for purposes of illustration and are not to be construed as limiting the scope of the invention.

*Example I*

A mixture of 198 grams of 2,4,5-trichlorophenol and 18.8 grams of paraformaldehyde were heated to 65° C. and well stirred. 65 grams of oleum 20% was added dropwise and the addition was so regulated that the temperature increased, without the application of external heat, until it reached 135° C. at the end of the acid addition, which took 10 to 15 minutes. The contents of the reaction vessel were stirred for two minutes more and then allowed to run into a solution of 100 grams of sodium hydroxide in 1000 cc. of water. The reaction flask was washed with a solution of 25 grams of sodium hydroxide in 250 cc. of water. The combined alkaline solutions were heated to boiling for five minutes. A small amount (6 grams) of alkali-insoluble material remained and was filtered off. Sulfuric acid (62% $H_2SO_4$ content) was then added at room temperature dropwise under stirring to the filtrate until a pH of 10.3 was reached. This required about 80 grams of the acid. The mono sodium salt of bis-(3,5,6-trichloro-2-hydroxyphenyl) methane precipitated out of solution and was filtered and then washed with 200 cc. of water. The salt was then suspended in 2000 cc. of water and sulfuric acid (62% $H_2SO_4$ content) was added under stirring until the contents were acid to Congo red paper. This required about 30 grams of the acid.

The resulting bis-(3,5,6-trichloro-2-hydroxyphenyl) methane was filtered, washed with water until acid-free and dried to constant weight at 100° C. (170 grams, melting point 154°–158° C.) Crystallization of the 170 grams of dried bis-(3,5 6-trichloro-2-hydroxyphenyl) methane from 300 grams toluene yielded a first crop amounting to 105 grams of substantially pure bis-(3,5,6-trichloro-2-hydroxyphenyl) methane, having a melting point of 161°–163° C.

*Example II*

A mixture of 198 grams of 2,4,5-trichlorophenol and 18.8 grams of paraformaldehyde were heated to 65° C. and well stirred. 65 grams of oleum 20% was added dropwise and the addition was so regulated that the temperature increased, without the application of external heat, until it reached 135° C. at the end of the acid addition, which took 10 to 15 minutes. The contents of the reaction vessel were stirred for two minutes more and then allowed to run into a solution of 100 grams of sodium hydroxide in 1000 cc. of water.

The contents of the reaction vessel were stirred for 2 minutes more and then allowed to run into a solution of 150 grams of caustic potash flakes (94% KOH) in 1000 cc. of water. The reaction flask was washed with a solution of 25 grams of caustic potash flakes in 250 cc. of water. The combined alkaline solutions were heated to boiling for 10 minutes and filtered while hot. A small amount of alkali-insoluble material remained on the filter. Sulfuric acid (62% $H_2SO_4$ content) was then added at room temperature dropwise under stirring to the filtrate until a pH of 10.3 was reached. This required about 80 grams of the acid.

The mono potassium salt of bis-(3,5,6-trichloro-2-hydroxyphenyl) methane precipitated out of solution, was filtered off, and then washed with 500 cc. of water. The salt was then suspended in 2000 cc. of water and sulfuric acid (62% $H_2SO_4$ content) was added under stirring until the contents were acid to Congo red paper. This required about 30 grams of acid. The resulting bis-(3,5,6-trichloro-2-hydroxyphenyl) methane was filtered, washed with hot water until free of sulfuric acid and potassium sulfate and dried to constant weight at 100° C. (185 grams, melting point 154°–157° C.). Crystallisation of the 185 grams of dried bis-(3,5,6-trichloro-2-hydroxyphenyl) methane from 320 grams toluene yielded a first crop amounting to 115 grams of substantially pure bis-(3,5,6-trichloro-2-hydroxyphenyl) methane, having a melting point of 161°–163° C.

Similar results as to yield and product, i. e., the mono potassium salt of bis-(3,5,6-trichloro-2-hydroxyphenyl) methane, are obtained, if in this example the 150 grams of caustic potash flakes are replaced by a mixture of caustic alkalis consisting of 56 grams of caustic soda and 72 grams of caustic potash flakes.

The foregoing illustrates the practice of this invention which however is not to be limited thereby but is to be construed as broadly as permissible in view of the prior art and limited solely by the appended claims.

We claim:

1. In the process for preparing bis-(3,5,6-trichloro-2-hydroxyphenyl) methane by condensing 2,4,5-trichlorophenol with a formaldehyde-yielding substance, the improvement which comprises conducting the condensation at elevated temperatures and in the presence of a substance selected from the group consisting of sulfuric acid having at least about 93% $H_2SO_4$ content by weight and oleum, said substance being employed in an amount not substantially more than one-third the weight of the 2,4,5-trichlorophenol employed.

2. In the process for preparing bis-(3,5,6-trichloro-2-hydroxyphenyl) methane by condensing 2,4,5-trichlorophenol with a formaldehyde-yielding substance, the improvement which comprises conducting the condensation at elevated temperatures within the range of about 65° C. to about 150° C. and in the presence of a substance selected from the group consisting of sulfuric acid having at least about 93% $H_2SO_4$ content by weight and oleum, said substance being employed in an amount not substantially more than one-third the weight of the 2,4,5-trichlorophenol employed.

3. In the process for preparing bis-(3,5,6-trichloro-2-hydroxyphenyl) methane by condensing 2,4,5-trichlorophenol with a formaldehyde-yielding substance, the improvement which comprises conducting the condensation at elevated temperatures within the range of about 65° C. to about 150° C. and in the presence of a substance selected from the group consisting of sulfuric acid having at least about 93% $H_2SO_4$ content by weight and oleum, said substance being employed in an amount equal to not more than one-third the weight of the 2,4,5-trichlorophenol employed.

4. The process for preparing bis-(3,5,6-trichloro-2-hydroxyphenyl) methane which comprises reacting 2,4,5-trichlorophenol with paraformaldehyde at elevated temperatures within the range of about 65° C. to about 150° C. and in the presence of a substance selected from the group consisting of sulfuric acid having at least about 93% $H_2SO_4$ content by weight and oleum, said substance being employed in an amount not substantially more than one-third the weight of the 2,4,5-trichlorophenol employed.

5. The process for preparing bis-(3,5,6-trichloro-2-hydroxyphenyl) methane which comprises reacting about 198 parts by weight of 2,4,5-tricholorophenol with about 18 parts by weight of paraformaldehyde in the presence of about 65 parts by weight of oleum 20%, at elevated temperatures within the range of about 65° C. to about 135° C.

6. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 135° C. for a period of about 5 to about 30 minutes.

7. In the process for preparing bis-(3,5,6-trichloro-2-hydroxyphenyl) methane by condensing 2,4,5-trichlorophenol with a formaldehyde-yielding substance, the improvement which comprises conducting the condensation at elevated temperatures and in the presence of a substance selected from the group consisting of sulfuric acid having at least about 93% $H_2SO_4$ content by weight and oleum, said substance being employed in an amount not substantially more than one-third the weight of the 2,4,5-trichlorophenol employed, and isolating the bis-(3,5,6-trichloro-2-hydroxyphenyl) methane in substantially pure form by forming and isolating the mono alkali metal salt of bis-(3,5,6-trichloro-2-hydroxyphenyl) methane from the reaction products and regenerating the bis-(3,5,6-trichloro-2-hydroxyphenyl) methane from said salt.

8. In the process for preparing bis-(3,5,6-trichloro-2-hydroxyphenyl) methane by condensing 2,4,5-trichlorophenol with a formaldehyde-yielding substance, the improvement which comprises conducting the condensation at elevated temperatures and in the presence of a substance selected from the group consisting of sulfuric acid having at least about 93% $H_2SO_4$ content by weight and oleum, said substance being employed in an amount not substantially more than one-third the weight of the 2,4,5-trichlorophenol employed, and isolating the bis-(3,5,6-trichloro-2-hydroxyphenyl) methane in substantially pure form by forming and isolating the mono sodium salt of bis-(3,5,6-trichloro-2-hydroxyphenyl) methane from the reaction products and regenerating the bis-(3,5,6-trichloro-2-hydroxyphenyl) methane from said salt.

9. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 150° C., and isolating the bis-(3,5,6-trichloro-2-hydroxyphenyl) methane in substantially pure form by forming and isolating the mono sodium salt of bis-(3,5,6-trichloro-2-hydroxyphenyl) methane from the reaction products and regenerating the bis-(3,5,6-trichloro-2-hydroxyphenyl) methane from said salt.

10. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 150° C., and isolating the bis-(3,5,6-trichloro-2-hydroxyphenyl) methane in substantially pure form by forming and isolating the mono potassium salt of bis-(3,5,6-trichloro-2-hydroxyphenyl) methane from the reaction products and regenerating the bis-(3,5,6-trichloro-2-hydroxyphenyl) methane from said salt.

11. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 135° C. for a period of about 5 to about 30 minutes, and isolating the bis-(3,5,6-trichloro-2-hydroxyphenyl) methane in substantially pure form by forming and isolating the mono alkali metal salt of bis-(3,5,6-trichloro-2-hydroxyphenyl) methane from the reaction products and regenerating the bis-(3,5,6-trichloro-2-hydroxyphenyl) methane from said salt.

12. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 135° C. for a period of about 5 to 30 minutes, and isolating the bis-(3,5,6-trichloro-2-hydroxyphenyl) methane in substantially pure form by forming and isolating the mono sodium salt of bis-(3,5,6-trichloro-2-hydroxyphenyl) methane from the reaction products and regenerating the bis-(3,5,6-trichloro-2-hydroxyphenyl) methane from said salt.

13. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 135° C. for a period of about 5 to 30 minutes, and isolating the bis-(3,5,6-trichloro-2-hydroxyphenyl) methane in substantially pure form by forming and isolating the mono potassium salt of bis-(3,5,6-trichloro-2-hydroxyphenyl) methane from the reaction products and regenerating the bis-(3,5,6-trichloro-2-hydroxyphenyl) methane from said salt.

14. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 150° C., isolating the bis-(3,5,6-trichloro-2-hydroxyphenyl) methane in substantially pure form by forming and isolating the mono sodium salt of bis-(3,5,6-trichloro-2-hydroxyphenyl) methane from the reaction products and regenerating the bis-(3,5,6-trichloro-2-hydroxyphenyl) methane from said salt by acidifying with sulfuric acid, and recrystallizing the bis-(3,5,6-trichloro-2-hydroxyphenyl) methane from a suitable solvent.

15. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 150° C., isolating the bis-(3,5,6-trichloro-2-hydroxyphenyl) methane in substantially pure form by forming and isolating the mono potassium salt of bis-(3,5,6-trichloro-2-hydroxyphenyl) methane from the reaction products and regenerating the bis-(3,5,6-trichloro-2-hydroxyphenyl) methane from said salt by acidifying with sulfuric acid, and recrystallizing the bis-(3,5,6-trichloro-2-hydroxyphenyl) methane from a suitable solvent.

16. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 135° C. for a period of about 5 to 30 minutes, isolating the bis-(3,5,6-trichloro-2-hydroxyphenyl) methane in substantially pure form by forming and isolating the mono sodium salt of bis-(3,5,6-trichloro-2-hydroxyphenyl) methane from the reaction products and regenerating the bis-(3,5,6-trichloro-2-hydroxyphenyl) methane from said salt by acidifying with sulfuric acid, and recrystallizing the bis-(3,5,6-trichloro-2-hydroxyphenyl) methane from a suitable solvent.

17. The process for preparing bis-(3,5,6-trichloro-2-hydroxyphenyl) methane which comprises reacting about 198 parts by weight of 2,4,5-trichlorophenol with about 18 parts by weight of paraformaldehyde in the presence of about 65 parts by weight of oleum 20%, at elevated temperatures within the range of about 65° C. to about 135° C. for a period of about 5 to 30 minutes, isolating the bis-(3,5,6-trichloro-2-hydroxyphenyl) methane in substantially pure form by forming and isolating the mono potassium salt of bis-(3,5,6-trichloro-2-hydroxyphenyl) methane from the reaction products and regenerating the bis-(3,5,6-trichloro-2-hydroxyphenyl) methane from said salt by acidifying with sulfuric acid, and recrystallizing the bis-(3,5,6-trichloro-2-hydroxyphenyl) methane from a suitable solvent.

MAX LUTHY.
WILLIAM S. GUMP.

REFERENCES CITED

The following references are of record in the file of this patent:

UNITED STATES PATENTS

| Number | Name | Date |
|---|---|---|
| 2,250,480 | Gump | July 29, 1941 |